United States Patent
Kuribayashi et al.

(10) Patent No.: US 7,345,439 B2
(45) Date of Patent: Mar. 18, 2008

(54) ROTARY ELECTRIC MACHINE FOR VEHICLE

(75) Inventors: Masaru Kuribayashi, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 40 days.

(21) Appl. No.: 10/560,597

(22) PCT Filed: Mar. 29, 2005

(86) PCT No.: PCT/JP2005/005923

§ 371 (c)(1),
(2), (4) Date: Dec. 13, 2005

(87) PCT Pub. No.: WO2005/101620

PCT Pub. Date: Oct. 27, 2005

(65) Prior Publication Data
US 2006/0138979 A1 Jun. 29, 2006

(30) Foreign Application Priority Data
Apr. 13, 2004 (JP) .............................. 2004-118044

(51) Int. Cl.
*H02P 1/00* (2006.01)
*H02P 3/00* (2006.01)
*H02P 5/00* (2006.01)

(52) U.S. Cl. ....................... 318/139; 318/376; 318/778

(58) Field of Classification Search .................... None
See application file for complete search history.

(56) References Cited

U.S. PATENT DOCUMENTS

| 6,713,888 B2 * | 3/2004 | Kajiura ..................... 290/40 F |
| 2003/0234578 A1 * | 12/2003 | Takahashi et al. .......... 303/168 |

FOREIGN PATENT DOCUMENTS

| JP | 5-292703 A | 11/1993 |
| JP | 11-027903 A | 1/1999 |
| JP | 11-41887 A | 2/1999 |
| JP | 11-122875 A | 4/1999 |
| JP | 2001-251819 A | 9/2001 |
| JP | 2002-136099 A | 5/2002 |

* cited by examiner

*Primary Examiner*—Lincoln Donovan
*Assistant Examiner*—Erick Glass
(74) *Attorney, Agent, or Firm*—Sughrue Mion, PLLC

(57) ABSTRACT

[Problem] In a conventional rotating electrical machine to perform starting and power generation, an inverter and a rotating electrical machine body are constructed to be separate bodies, and a three-phase harness is provided between the rotating electrical machine and the inverter, and by a voltage drop or loss in this portion, there have been limitations in the improvement of starting and power generation output, and efficiency at the time of same operating current (determined by thermal limitation of the inverter).

[Means for Resolution] Since an inverter unit 22 is integrally attached to a rear bracket 44 and is integrally mounted on the end face of a rotating electrical machine 20 in an axial direction, harnesses to be connected can be made short, and reduction in weight of the harness and improvement in resistance to outer disturbance noise can be realized. Besides, as a rotor 40, since a claw-pole type rotor is constructed in which permanent magnets 40c and 40d are added, inverter base current is reduced, so that the size of the inverter unit 22 can be miniaturized, and it can be integrally mounted to the starting and power generation electrical machine.

8 Claims, 10 Drawing Sheets

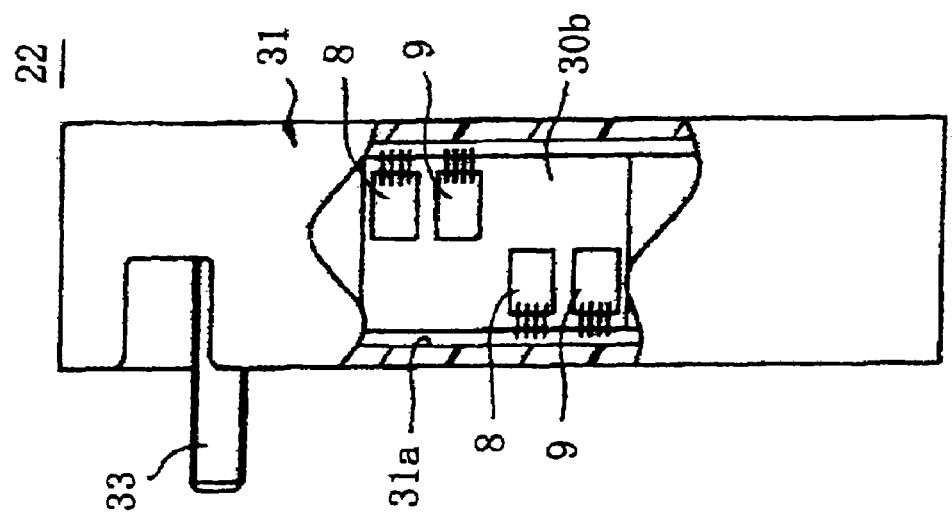
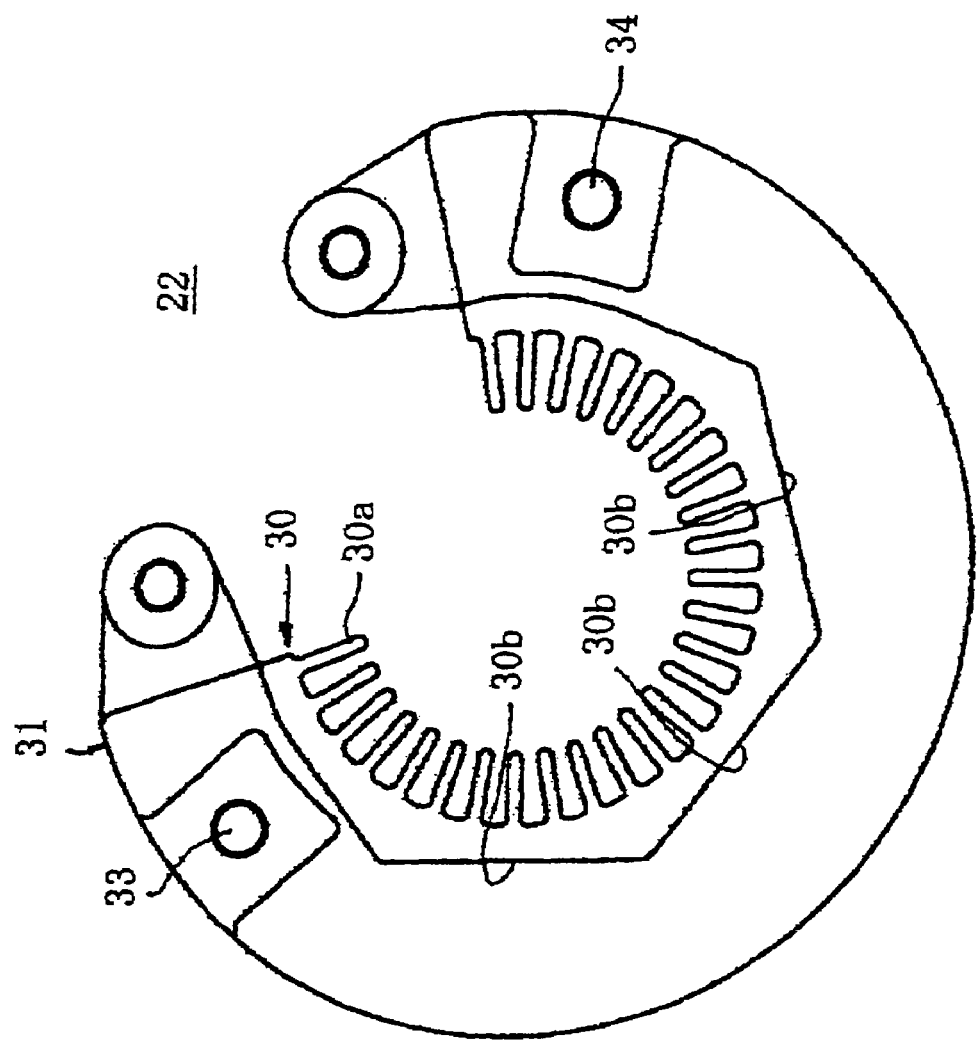

ROTARY ELECTRIC MACHINE FOR VEHICLE

TECHNICAL FIELD

The present invention relates to a vehicular rotating electrical machine apparatus mounted in an electric vehicle, a hybrid electric vehicle or the like, and particularly to a vehicular rotating electrical machine apparatus in which a rotating electrical machine and an inverter unit to control the rotating electrical machine are integrated, and which has functions of both a starting motor and an electric generator.

BACKGROUND ART

In recent years, against the background of prevention of global warming, emission reduction of $CO_2$ has been demanded. The reduction of $CO_2$ in an automobile means an improvement in fuel consumption performance, and as one of the solutions, the development and commercial application of an electric vehicle (EV) or a hybrid electric vehicle (HEV) has been pursued.

Especially, functions requested for a rotating electrical machine mounted in a hybrid electric vehicle include idling stop at the time of vehicle stop, energy regeneration during deceleration running, torque assist during acceleration running, and the like, and the fuel consumption performance can be improved by realizing these.

As the rotating electrical machine for this, a motor generator is transversely mounted at the outside of an engine, a belt is stretched between the motor generator and a crank shaft pulley, and bidirectional driving force transmission is performed between the motor generator and the engine.

At the time of electric operation, DC power of a battery is converted into AC power by an inverter. This AC power is supplied to the motor generator, and the motor generator is rotation-driven. This rotation force is transmitted to the engine through the belt, and the engine is started. On the other hand, at the time of electric power generation, part of the driving force of the engine is transmitted to the motor generator through the belt, and AC power is generated. This AC power is converted into DC power by the inverter and is stored in the battery.

As this kind of conventional art, for example, patent document 1 or 2 discloses an inverter additionally provided at the outer periphery of a rotating electrical machine in a radial direction or at the end face thereof in an axial direction, and a cooling structure of the rotating electrical machine and the inverter by a cooling fan of the rotating electrical machine. However, there is no disclosure as to the sufficient size of the inverter device for exhibiting characteristics of the rotating electrical machine, measures to miniaturize the inverter for integral mounting, and the like.

Patent document 1: JP-A-11-122875 (paragraphs 0025 to 0034 and FIG. 1)

Patent document 2: JP-A-11-27903 (paragraphs 0013 to 0018 and FIG. 1)

DISCLOSURE OF THE INVENTION

PROBLEMS THAT THE INVENTION IS TO SOLVE

In a conventional rotating electrical machine for performing starting and power generation, an inverter and a rotating electrical machine body are constructed to be separate bodies, and a three-phase harness is provided between the rotating electrical machine and the inverter, and by a voltage drop and loss in this portion, there have been limitations in the improvement of starting and electric power generation output, and efficiency at the time of the same operating current (determined by thermal limitation of the inverter).

Besides, the inverter needs a dedicated cooling structure, and the size becomes large and the cost is high, and in the case where it is mounted in a vehicle or the like, the working is complicated, and there has been a limitation in the increase of the operating current to determine the output of the rotating electrical machine.

Further, since the inverter and the rotating electrical machine body are coupled by the three-phase harness, the working at the time of mounting is complicated, and the cost has been high. In addition, switching noise due to the inverter is carried through this three-phase harness, and this noise has also been a large obstacle in consideration of mounting.

MEANS FOR SOLVING THE PROBLEMS

According to the invention, in a vehicular rotating electrical machine apparatus including a rotating electrical machine which includes a rotor having a field winding, and a stator disposed at an outer periphery of the rotor and having a stator winding, and performs electric power generation and starting, and an inverter unit which converts DC power of a battery into AC power at a time of a starting motor operation of the rotating electrical machine and supplies it to the stator winding, and converts AC power generated in the stator winding into DC power at a time of a generator operation of the rotating electrical machine and charges the battery, the inverter unit is integrally mounted to the rotating electrical machine and is electrically connected to the stator winding, the rotor includes a rotor iron core which includes a magnetic part where adjacent magnetic poles are formed to have different polarities and a cylindrical part having a field winding, and a permanent magnet which is disposed between the magnetic poles and supplies, together with the field winding, magnetic flux to the stator iron core, and the magnetic flux by the permanent magnet is adjusted so that in an actual use rotation speed range of the rotating electrical machine, a deenergization no-load induced voltage or a deenergization induced voltage in a minimum electric load power generation state does not exceed the battery voltage.

ADVANTAGE OF THE INVENTION

According to the invention, in the vehicular rotating electrical machine apparatus in which the rotating electrical machine and the inverter unit to control the rotating electrical machine are combined so as to have functions of both the starting motor and the electric generator, the inverter current can be suppressed by increasing the total amount of magnetic flux by the permanent magnet disposed between the magnetic poles of the rotor, the miniaturization of the inverter unit is realized, and it can be integrally mounted on the limited surface of the rotating electrical machine, and further, losses at the inverter part, the rotating electrical machine part and the three-phase harness part can be reduced by the decrease of the inverter current, and the power generation and starting output and the efficiency can be improved.

BEST MODE FOR CARRYING OUT THE INVENTION

Embodiment 1

FIG. 1 is a longitudinal sectional view showing a vehicular rotating electrical machine apparatus of embodiment 1 of the invention, and FIG. 2 is a view for explaining a structure of an inverter unit in embodiment 1, in which (a) is a partially-cutaway side view, and (b) is a plan view thereof.

In FIG. 1 and FIG. 2, a rotating electrical machine 20 includes a claw-pole type rotor 40 fixed to a shaft 41 and rotatably mounted to a front bracket 43 and a rear bracket 44, a stator 42 held by side ends of the front bracket 43 and the rear bracket 44 and disposed so as to surround the rotor 40, fans 45 fixed to both end faces of the rotor 40 in an axial direction, a pulley 46 fixed to an end of the shaft 41 at a front side, a brush holder 47 disposed on an inner wall surface of the rear bracket 44 so that it is positioned at the rear side outer periphery of the shaft 41, and a pair of brushes 48 disposed in the brush holder 47 so as to come in slide contact with a pair of slip rings 49 fitted to the rear side of the shaft 41. This rotating electrical machine 20 is coupled to an engine (not shown) through the pulley 46 and a belt (not shown).

Besides, suction holes 43a and 44a are provided in the end faces of the front bracket 43 and the rear bracket 44, and exhaust holes 43b and 44b are provided in the side surfaces of the front bracket 43 and rear the bracket 44.

An inverter unit 22 includes a heat sink 30 which is radiation-designed so as to have heat capacity capable of sufficiently receiving heat loss quantity due to heat generation from a switching element 8, a resin mold part 31 integrally molded by insulating resin at the outer peripheral part of the heat sink 30, a control circuit board 32 on which an electric part to ON/OFF control the switching element 8 is mounted, and power source terminals 33 and 34.

The heat sink 30 is formed of high heat conductor, such as copper or aluminum, into a C shape, plural fins 30a are formed on the inner peripheral surface in a circumferential direction, and three flat surfaces 30b are formed on the outer peripheral surface. A switching element 8 and a diode 9 are connected in parallel to each other to form a pair, and two such pairs are fixed to each of the flat surfaces 30b.

A housing space 31a housing an element group of the switching elements 8 and the diodes 9 and the control circuit board 32 is formed in the resin mold part 31. The respective flat surfaces 30b of the heat sink 30 are exposed in the housing space 31a. Further, although not shown, an insert conductor is insert-molded in the resin mold part 31, and a part of the insert conductor is exposed as a connection terminal at a specified position. Incidentally, the power source terminals 33 and 34 are attached to the resin mold part 31 and are respectively electrically connected to connection terminals constituting a positive electrode and a negative electrode of the inverter unit 22.

The switching elements 8 and the diodes 9 are fixed to the respective flat surfaces 30b, and the respective terminals of the control circuit board 32 are electrically connected to the respective terminals of the switching elements 8 and the diodes 9 and are attached in the housing space 31a. Further, after the control circuit board 32 and the connection terminal of the insert conductor are connected, the housing space 31a is sealed by a lid 35, and the inverter unit 22 is assembled.

The inverter unit 22 constructed as stated above is disposed so as to cause the length direction of the fin 30a (direction orthogonal to the paper plane of FIG. 5(b)) to be coincident with the axial centre direction of the shaft 41 and so as to surround the shaft 41, and is attached to the end face (outer wall surface) of the rear bracket 44 by an attachment (not shown). An end of the A connection of a stator winding 21 is connected to the connection terminal of the insert conductor connected to a middle point of the switching elements 8 connected in series to each other. Further, the power source terminals 33 and 34 are connected to a first battery 11.

FIG. 3 is an outer appearance perspective view showing a structure of the claw-pole type rotor including a permanent magnet according to embodiment 1.

In FIG. 3, the rotor 40 is the claw-pole type rotor, and includes pawl-like magnetic pole parts 40a and 40b opposite to the inner diameter of the stator 42 through a specified gap, and the magnetic pole parts 40a and 40b are respectively formed to have a specified number of poles and are alternately crossed so as to cover the outer diameter side of a cylindrical part having a field winding 4. The adjacent magnetic pole parts 40a and 40b are arranged in the circumferential direction at a constant pitch with a specified interval and are magnetized by the field winding 4 so as to have different polarities alternately. Then, a pair of permanent magnets 40c and 40d are interposed between the adjacent magnetic poles 40a and 40b, and the permanent magnets 40c and 40d are magnetized so that the respective magnetic poles 40a and 40b become the same magnetic poles as the magnetization by the field winding 4.

FIG. 4 is a conceptual view showing a system circuit in the vehicular rotating electrical machine apparatus of embodiment 1.

In FIG. 4, the rotating electrical machine 20 is a belt-driven rotating electrical machine and includes the stator winding 21 of the stator (not shown) and the field winding 4 of the rotor (not shown), and the rotor is coupled to a rotation shaft of an engine 1 through a belt (not shown). Here, the stator winding 21 is constructed by Δ-connecting four-turn three-phase coils.

The inverter unit 22 includes an inverter module 23 including the plural switching elements 8 and the diodes 9 connected in parallel to the respective switching elements 8, and a capacitor 7 connected in parallel to the inverter module 23. This capacitor 7 has a function to smooth the current flowing through the inverter module 23.

The inverter modules 23 is constructed such that the switching element 8 and the diode 9 are connected in parallel to each other to form a pair, two such pairs are connected in series to each other to form a set, three such sets are arranged in parallel to each other, and those elements 8 and 9 are integrally sealed in a package. Each of the ends of the Δ connection of the stator winding 21 is connected to the middle point of the switching elements 8 connected in series to each other.

In the inverter module 23, the switching operation of the switching element 8 is controlled by a control device 24. When electric power is supplied, the rotating electrical machine 20 operates as the starting motor and starts the engine 1. After the starting of the engine 1, the rotating electrical machine 20 is rotation-driven by the engine 1 and operates as the AC power generator, and three-phase AC voltage is generated.

Next, the operation of a conventional vehicular power source device constructed as stated above will be described.

First, the control device 24 ON/OFF controls the respective switching elements 8 to generate three-phase AC power from DC power of the first battery 11. This three-phase AC power is supplied to the stator winding 21 of the rotating electrical machine 20, rotating magnetic field is applied to the field winding 4 of the rotor 40, and the rotor 40 is rotation-driven. The rotating force of the rotor 40 is transmitted to the engine 1 through the pulley 46 and the belt (not shown), and the engine 1 is rotation-driven, that is, started.

When the engine 1 is started, the rotating force of the engine 1 is transmitted to the rotating electrical machine 20 through the belt and the pulley 46. By this, the rotor 40 is rotation-driven, and the three-phase AC voltage is induced in the stator winding 21. The control device 24 ON/OFF controls the respective switching elements 8 to rectify the three-phase AC voltage induced in the stator winding 21 into direct current. The battery 11 is charged by the DC power rectified by the inverter unit 22.

As described above, in the above embodiment 1, since the inverter unit 22 is integrally attached to the rear bracket 44 and is integrally mounted on the end face of the rotating electrical machine 20 in the axial direction, the harnesses to be connected can be made short, the weight of the harness is reduced, and the resistance to disturbance noise is improved.

Besides, since the heat sink 30 is radiation-designed so as to have the heat capacity capable of sufficiently receiving the heat loss quantity due to the heat generation from the switching elements 8, miniaturization of the heat sink 30, that is, miniaturization of the inverter unit 22 is realized, and the mountability of the inverter unit 22 to the rear bracket 44 is improved.

Besides, the structure is made such that cooling is performed by the cooling fan 45 of the rotating electrical machine in order of the inverter unit 22, the rotor 40 and the stator 42, and the cooling medium of the inverter unit 22 is used also as the cooling medium (cooling air) of the rotating electrical machine 20, and accordingly, the cooling structure is simplified.

Besides, the fins 30*a* are provided on the heat sink 30 of the inverter unit 22, and cooling air formed by the driving of the fan 45 flows along the heat sinks 30, so that after the heat generated by the switching elements 8 and the diodes 9 are conducted to the heat sink 30, the heat is radiated to the cooling air through the fins 30*a*. Accordingly, as compared with a natural cooling structure, the cooling efficiency is high, and the miniaturization of the heat sink 30 is further facilitated.

Further, in this embodiment 1, since the claw-pole type rotor in which the permanent magnets 40*c* and 40*d* are added is constructed as the rotor 40, the inverter base current is reduced, and accordingly, the size of the inverter unit 22 can be made small, and it can be integrally mounted to the start generator.

That is, FIG. 5 is a no-load characteristic view showing an effect of the permanent magnets 40*c* and 40*d* disposed between the adjacent magnetic poles 40*a* and 40*b* of the rotor 40. From FIG. 5, it is understood that the total amount of magnetic flux is increased by the permanent magnets 40*c* and 40*d*.

FIG. 6 shows an effect in a starting characteristic by the permanent magnets 40*c* and 40*d*. The characteristic A in the drawing indicates the drive characteristic in which the permanent magnets 40*c* and 40*d* are not disposed, and the characteristic B indicates the case where the permanent magnets 40*c* and 40*d* are disposed. In a smoothly decreasing area of constant output, the effect of the permanent magnets 40*c* and 40*d* does not appear by the regulation of the power source voltage, however, the effect of the permanent magnets 40*c* and 40*d* remarkably appears in the torque constant area determined by the current capacity of the inverter unit 22. Inverter currents in both the characteristics A and B and in the torque constant area are the same. This means that the base inverter current can be reduced.

The current capacity of the inverter unit 22 at the switching element 8 is determined by the base inverter current, the time for which this base inverter current flows, and the element temperature at the time of starting. Since the time for which the base inverter current flows is generally very short, the size of the inverter unit 22 (that is, the current capacity of the switching element 8) is determined by the inverter current and the element temperature.

As stated above, the total amount of magnetic flux is increased by the permanent magnets 40*c* and 40*d* disposed between the adjacent magnetic poles 40*a* and 40*b* of the rotor 40, and the inverter current can be suppressed, and accordingly, the miniaturization of the inverter unit 22 is realized, and it can be integrally mounted on the limited surface of the rotating electrical machine. Since the inverter current is decreased, losses in the inverter unit part, the rotating electrical machine part, and the three-phase harness part can be reduced, and the efficiency of the power generation and the starting output can be improved. Besides, since the three-phase harness can be shortened, and the voltage drop at this part can be reduced, the voltage usage rate at the time of the starting motor operation is improved, and further, the main magnetic flux is increased, and the base torque can be increased, and thereby the starting characteristic can be improved.

Besides, FIG. 7 shows an effect in a power generation characteristic by the disposition of the permanent magnets 40*c* and 40*d*. In the drawing, the characteristic C indicates a power generation characteristic in a case where the permanent magnet 40*c* and 40*d* do not exist, and the characteristic D indicates a power generation characteristic in a case where the permanent magnets 40*c* and 40*d*, the permanent magnets 40*c* and 40*d* are disposed between the magnetic poles 40*a* and 40*b* of the rotor 40. As described above, by increasing the total amount of magnetic flux due to the magnetic poles 40*c* and 40*d*, the power generation characteristic at the power generation start rotation speed and in all areas is improved.

In order to obtain the same power generation characteristic as the characteristic C as the base, when the number of coil turns of the stator winding 21 is decreased, the induced electric power is lowered, and matching can be made to the power generation characteristic almost equal to the characteristic C. When the number of coil turns of the stator winding 21 is decreased, the stator coil resistance is reduced, and the generation efficiency at the time of the same generation output is improved. That is, the temperature lowering of the rotating electrical machine 20 at the time of continuous power generation can be realized, and the miniaturized inverter can be integrally mounted.

Further, FIG. 8 shows a no-load characteristic view for explaining the operation and effect in embodiment 1.

At the power generation operation time when field current is not applied, an induced voltage is generated by the magnetic flux of the permanent magnets 40*c* and 40*d* disposed between the magnetic poles 40*a* and 40*b* of the rotor 40, and in a driving state in which an electric load becomes unnecessary, it exceeds the power supply system voltage by only this magnetic flux. (in the case of 12-V battery power source, point E in FIG. 8)

With respect to the deenergization no-load induced voltage by the permanent magnets 40*c* and 40*d*, although control of three-phase short-circuit or the like is needed in a portion where it exceeds the power source system voltage, in the integrally mounted inverter unit 22, in order to continuously receive the short-circuit current, it is necessary to increase the number of switching elements, and this is unsuitable for integral mounting.

Thus, the magnetic flux by the permanent magnets 40c and 40d is adjusted so that the deenergization no-load induced voltage does not exceed the power source system voltage, and consequently, adaptation can be made to the inverter integral mounting structure.

Further, FIG. 9 is a correlation view of electric load and deenergization induced voltage for explaining the operation and effect in embodiment 1.

For example, in a vehicle, a necessary minimum electric load always exists during running, and an electric load request does not become lower than the amount of this electric load. In general, the necessary minimum electric load is approximately 7 to 12 A. In this case, in the characteristic in FIG. 9, it is understood that a specific control such as the foregoing three-phase short-circuit is not needed. (In FIG. 9, in the case of a power source system voltage of 12V, the necessary minimum electric load is larger than point F)

Accordingly, in this case, as compared with the case explained in FIG. 8, since the permanent magnets 40c and 40d can be made small by the adjustment (adjustment toward inferior direction) of the magnetic flux, the starting and power generation characteristics can be further improved.

Embodiment 2

FIG. 10 shows a vehicular rotating electrical machine apparatus of embodiment 2 in which an inverter unit 22 is integrally mounted on a surface of a rotating electrical machine 20 in a radial direction, and is electrically connected to a stator winding 21 through a harness 50. Incidentally, a resolver 60 for detecting a rotation position is additionally provided at a shaft end of the rotating electrical machine 20.

That is, as described in embodiment 1, permanent magnets 40c and 40d are disposed between adjacent magnetic poles 40a and 40b and magnetic poles 40a and 40b of a rotor 40, so that the number of coil turns of the stator winding 21 can be designed to be small, and by this, the output at the time of driving is improved, and further, the efficiency at the time of power generation is improved, and heat generation due to a loss at the time of starting power generation is suppressed. Accordingly, as in embodiment 2, the inverter unit 22 can be mounted on the surface of the stator 42, which is a largest heat generation part, in the radial direction as the downstream side, and this is effective in the case where there is a mounting restriction in the axial direction of the rotating electrical machine 20.

Embodiment 3

FIG. 11 is a partial sectional view of a stator slot of the rotating electrical machine 20.

In the drawing, six stator coils 21a constituting the stator winding 21 are contained in a stator slot 42a of the rotating electrical machine 20 through an insulator 42b. FIG. 11(a) shows an example in which the stator coil sectional shape is round, and FIG. 11(b) shows an example in which a rectangular wire is applied.

As shown in FIG. 11(b), by applying the rectangular wire or the stator coil arrayed or shaped into a rectangular shape, as compared with the round wire, an occupied ratio in the stator slot 42a is raised in the same number of stator coil turns, the stator coil resistance is lowered, and the inverter current can be reduced in the same drive characteristic. By this, since the inverter unit 22 is miniaturized and heat generation in the inverter unit 22 can be suppressed, the reliability of the inverter unit 22 is improved. Besides, in a power generation characteristic, power generation becomes possible from an area where start-up rotation speed is low.

FIG. 12 shows a state of a stator coil turn part 21b to which a rectangular wire is applied.

At the stator coil turn part 21b, although rounding is performed at a ½ magnetic pole pitch from a containing slot to a next containing slot, bending at an edge part is always needed in the rectangular wire shown in FIG. 12. At the edge part of the rectangular wire, bending is difficult, and further, peeling of an insulating coating has been a problem. Besides, although rounding is performed so as to smooth the bending ratio of the stator coil turn part in order to avoid these problems, the stator coil end length becomes long by this, and the stator coil resistance has been increased.

When the stator coil sectional shape is round in the stator coil turn part, the problem as described above does not exist, the stator coil end length can be shortened, and the stator coil resistance can be reduced.

BRIEF DESCRIPTION OF THE DRAWINGS

[FIG. 2] It is a partially longitudinal sectional view and a plan view of an inverter unit in FIG. 1.

Figure 1:
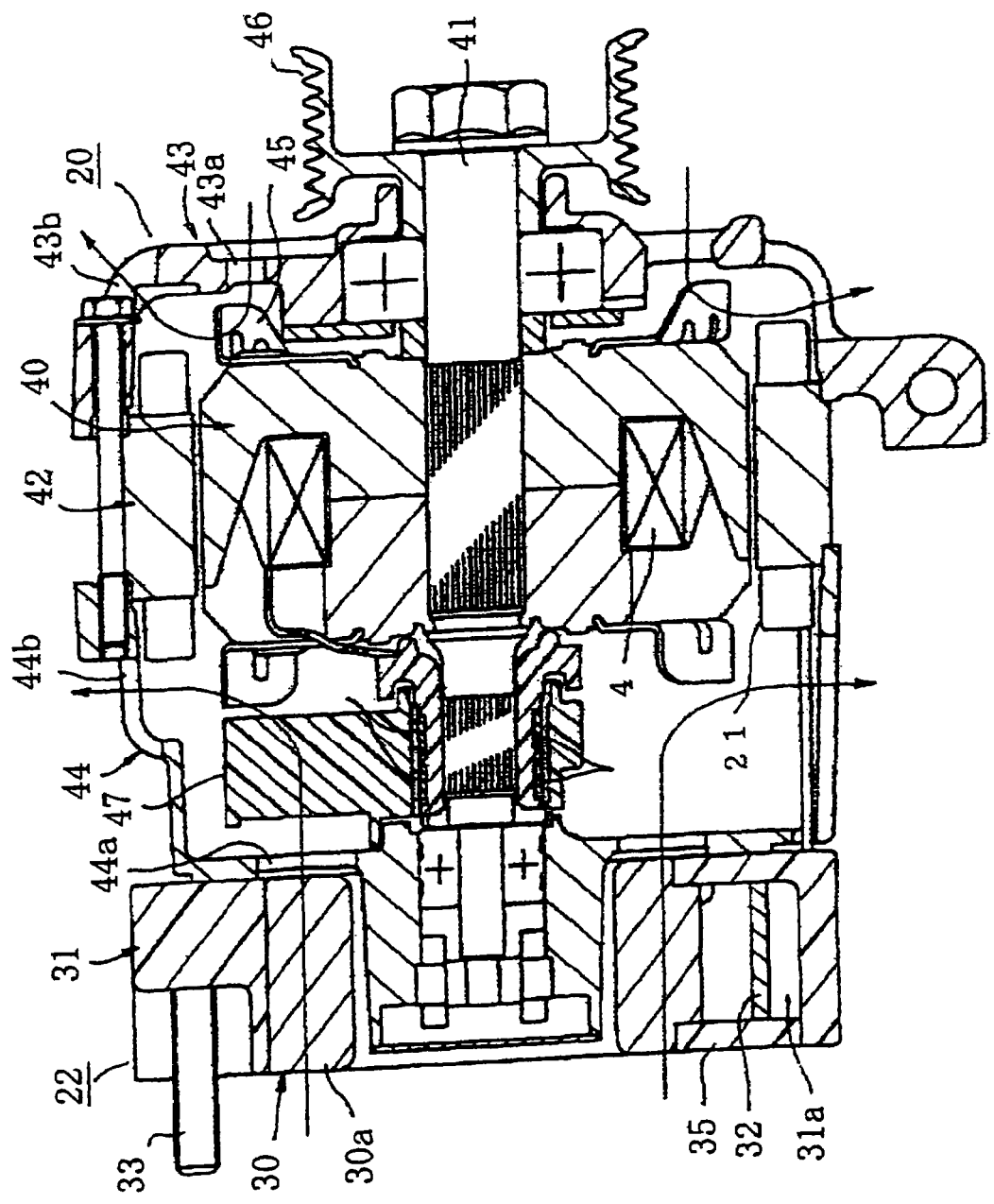
[FIG. 1] It is a longitudinal sectional view showing a vehicular rotating electrical machine apparatus of embodiment 1 of the invention.
Figure 3:
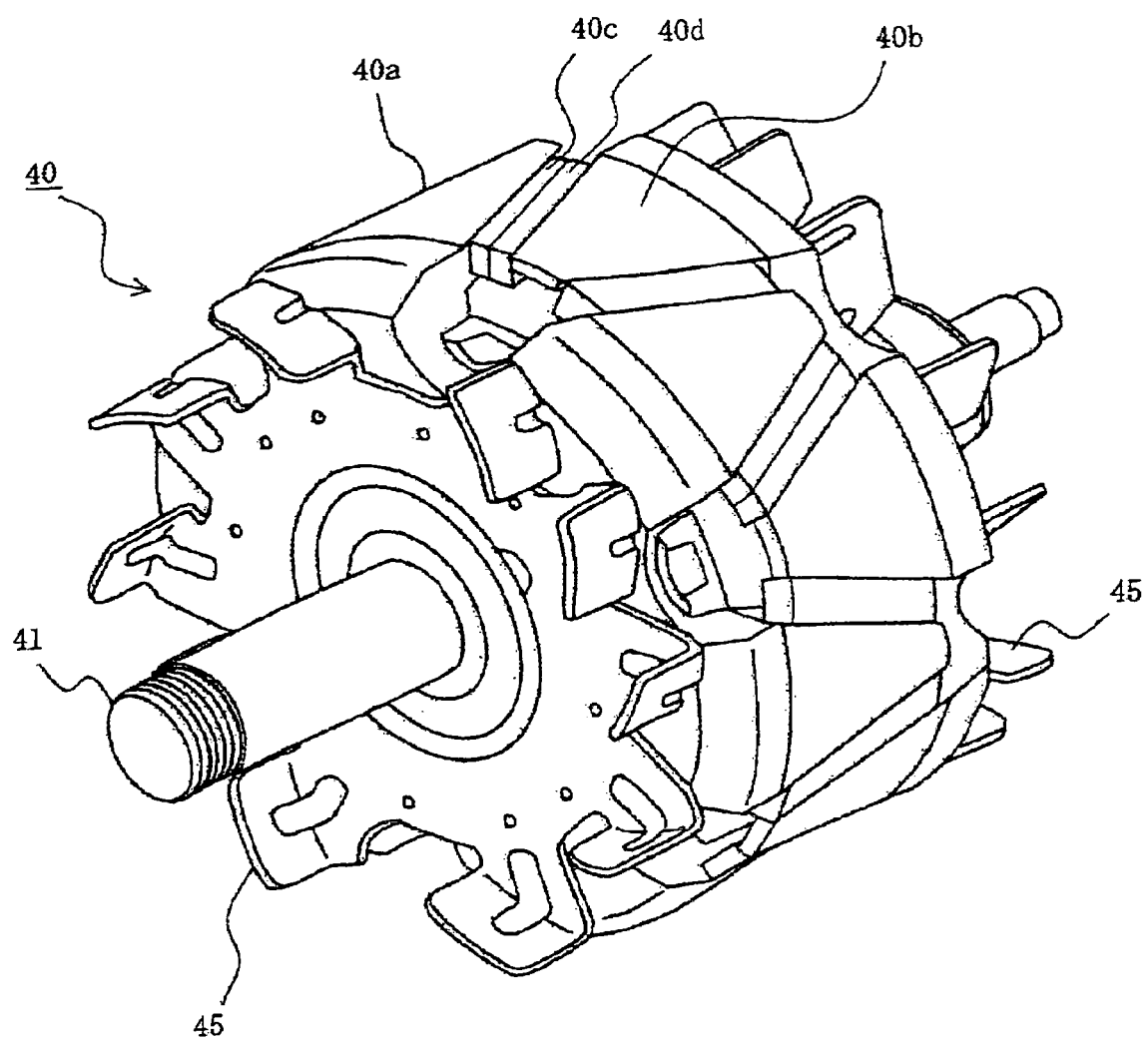
[FIG. 3] It is an outer appearance view of a claw-pole type rotor including a permanent magnet in FIG. 1.
Figure 4:
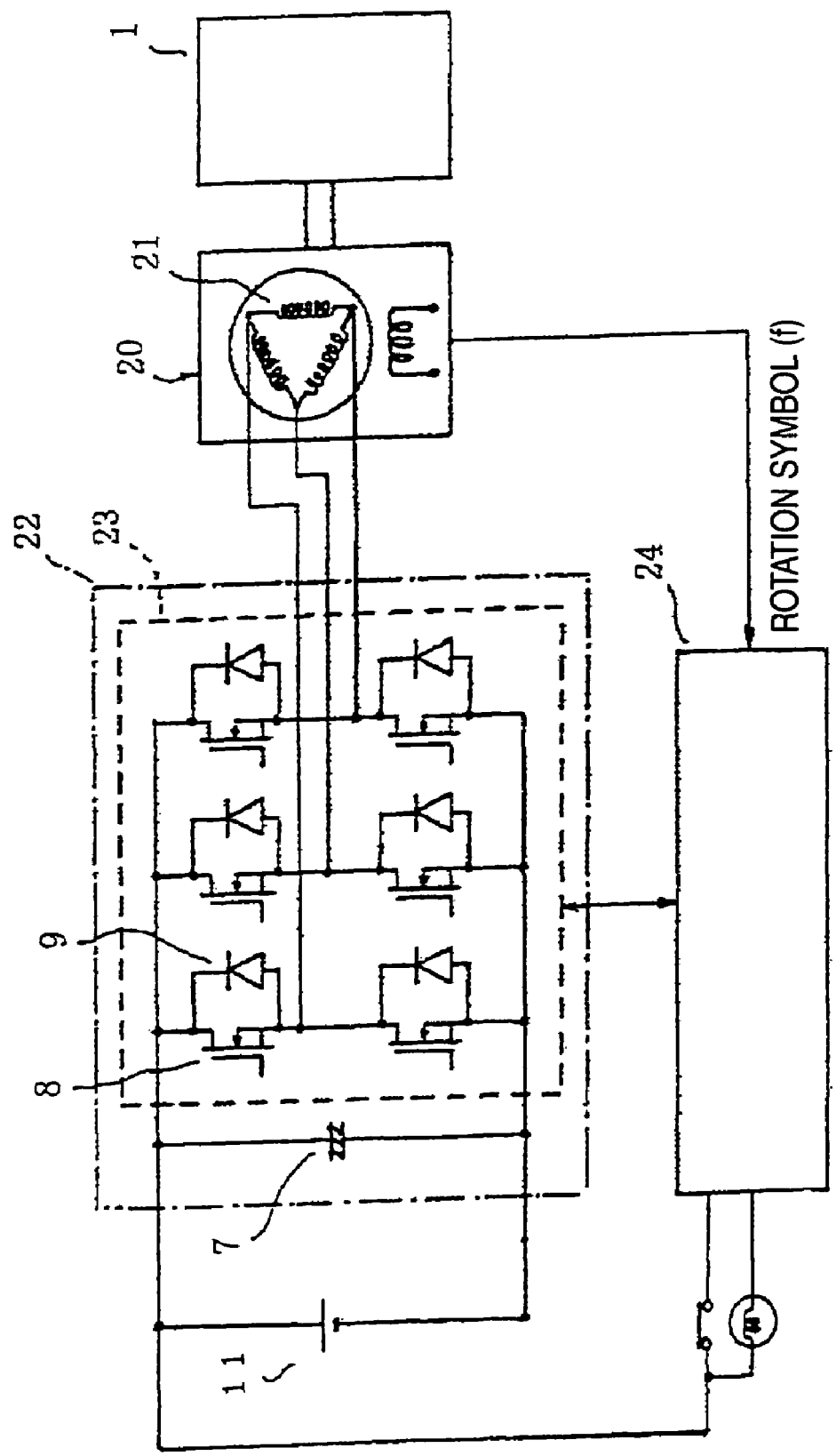
[FIG. 4] It is a conceptual view showing a system circuit in embodiment 1.
Figure 5:
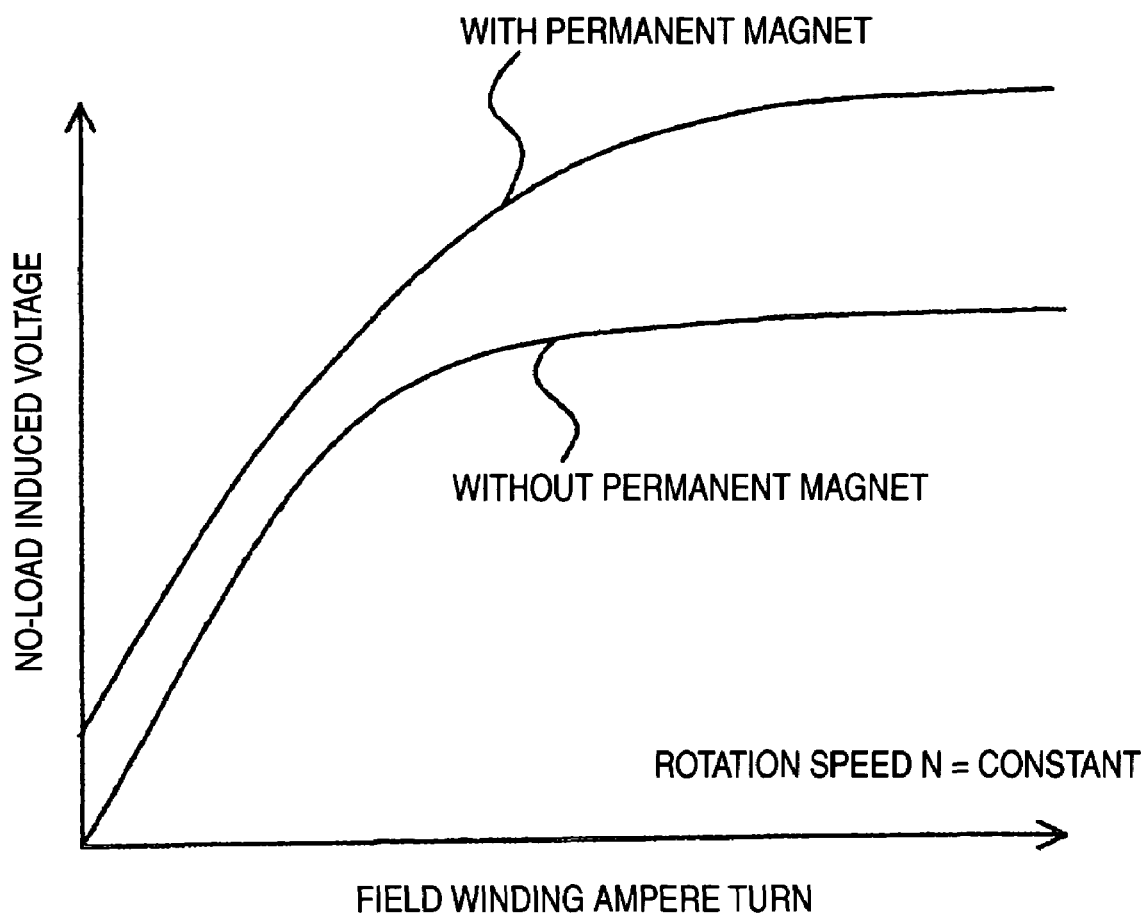
[FIG. 5] It is a first electrical characteristic view for explaining the operation and effect in embodiment 1.
Figure 6:
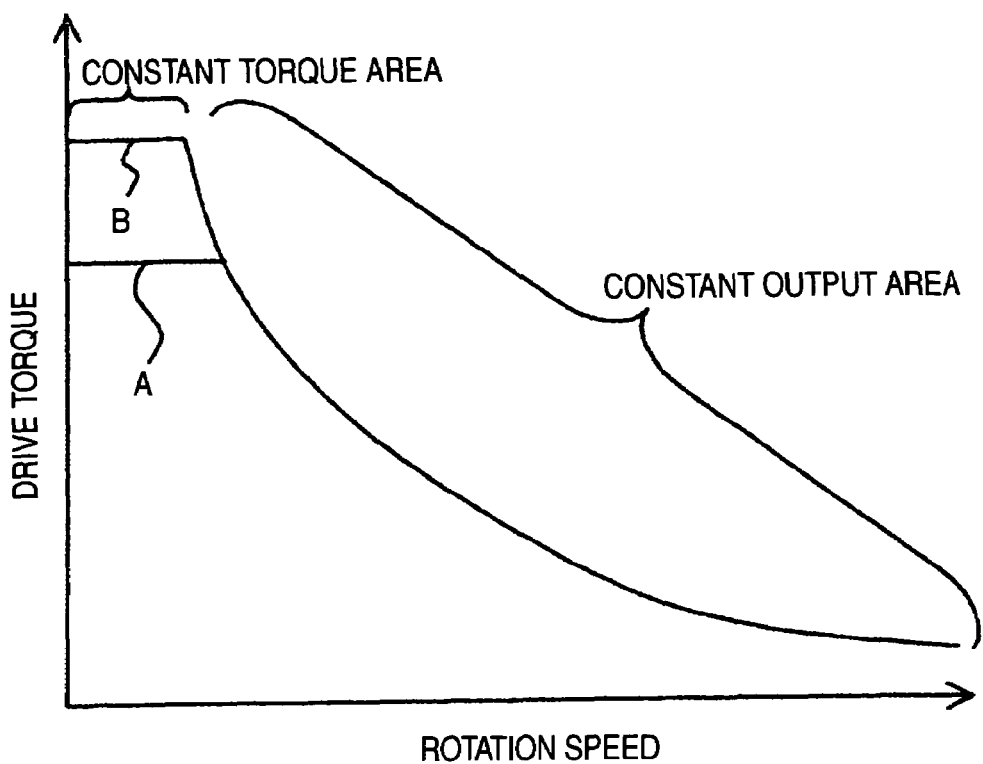
[FIG. 6] It is a second electrical characteristic view for explaining the operation and effect in embodiment 1.
Figure 7:
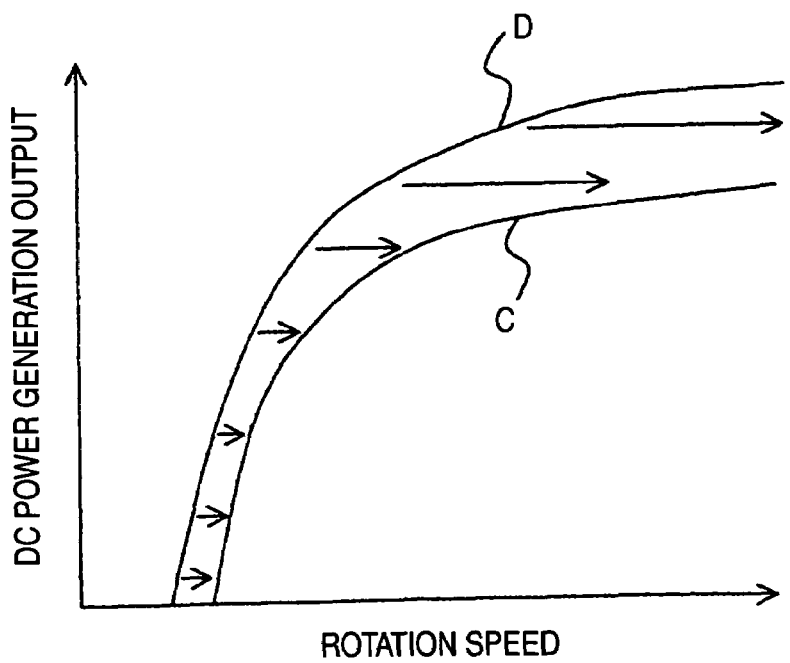
[FIG. 7] It is a third electrical characteristic view for explaining the operation and effect in embodiment 1.
Figure 8:
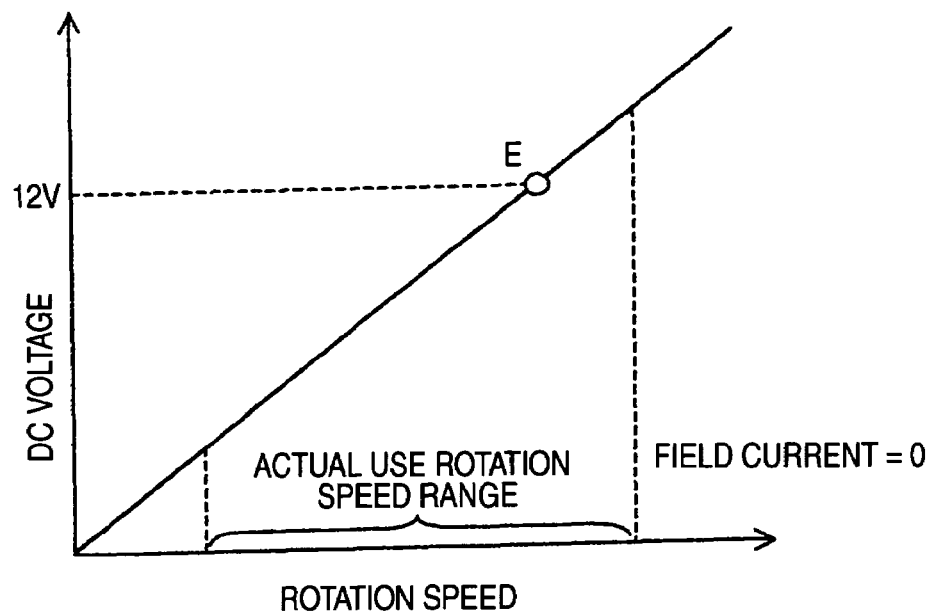
[FIG. 8] It is a fourth electrical characteristic view for explaining the operation and effect in embodiment 1.
Figure 9:
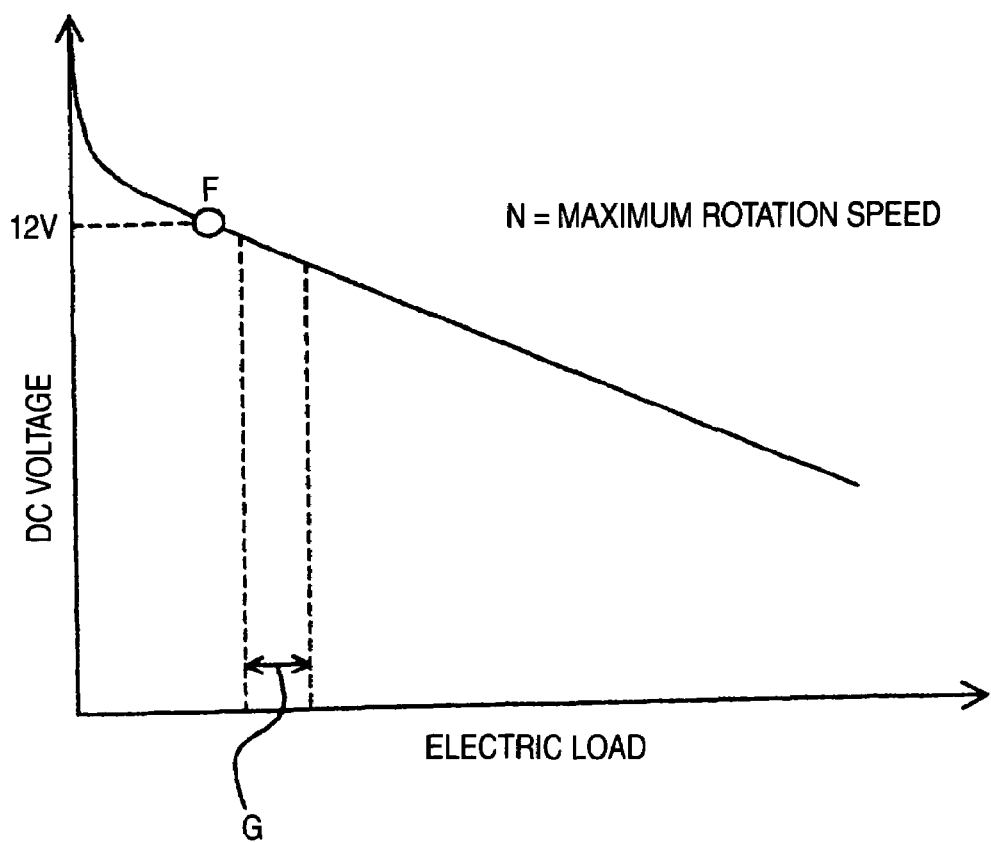
[FIG. 9] It is a fifth electrical characteristic view for explaining the operation and effect in embodiment 1.
Figure 10:
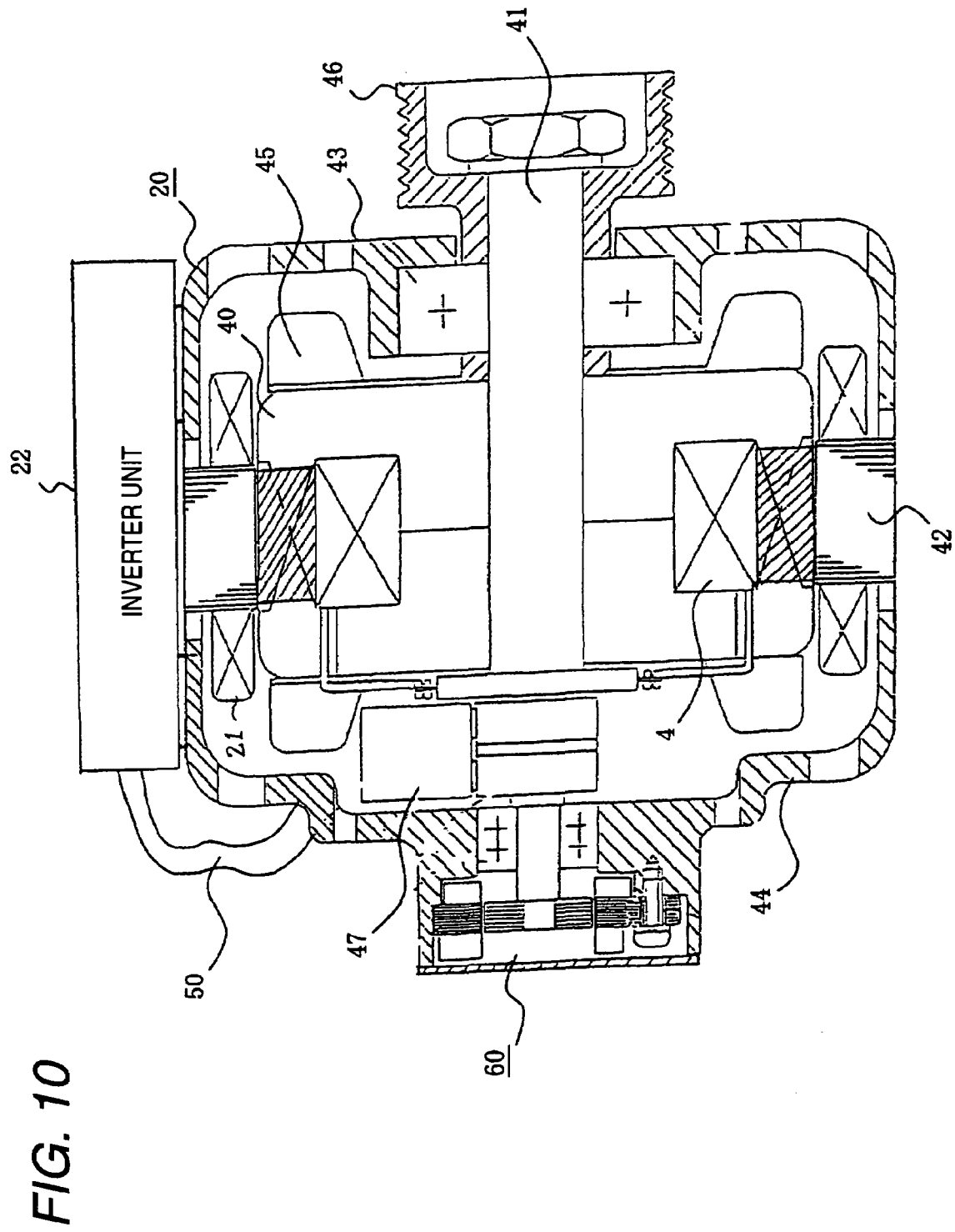
[FIG. 10] It is a longitudinal sectional view showing a vehicular rotating electrical machine apparatus of embodiment 2 of the invention.
Figure 11A:
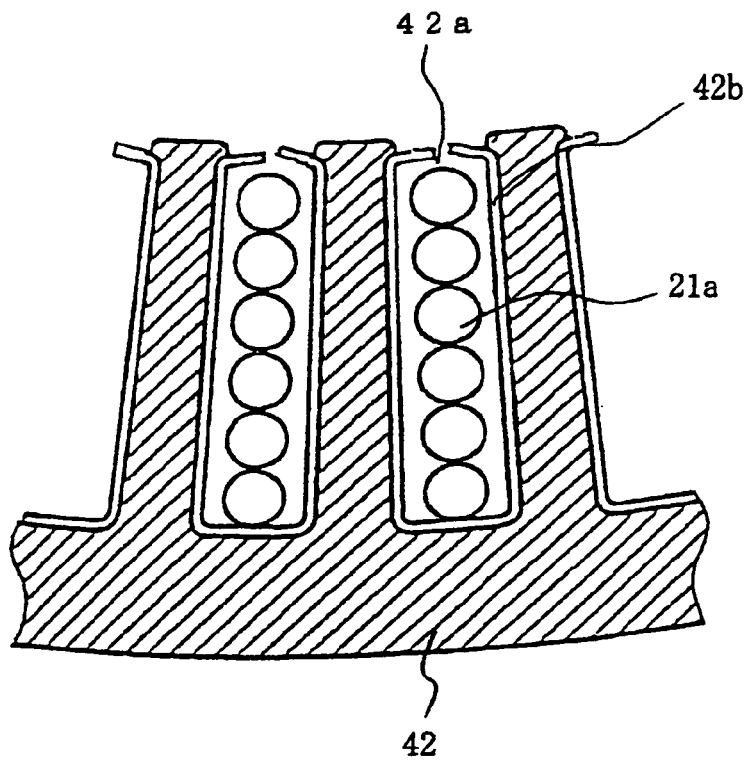
[FIG. 11] It is a main part sectional view of a stator slot part showing embodiment 3 of the invention.
Figure 11B:
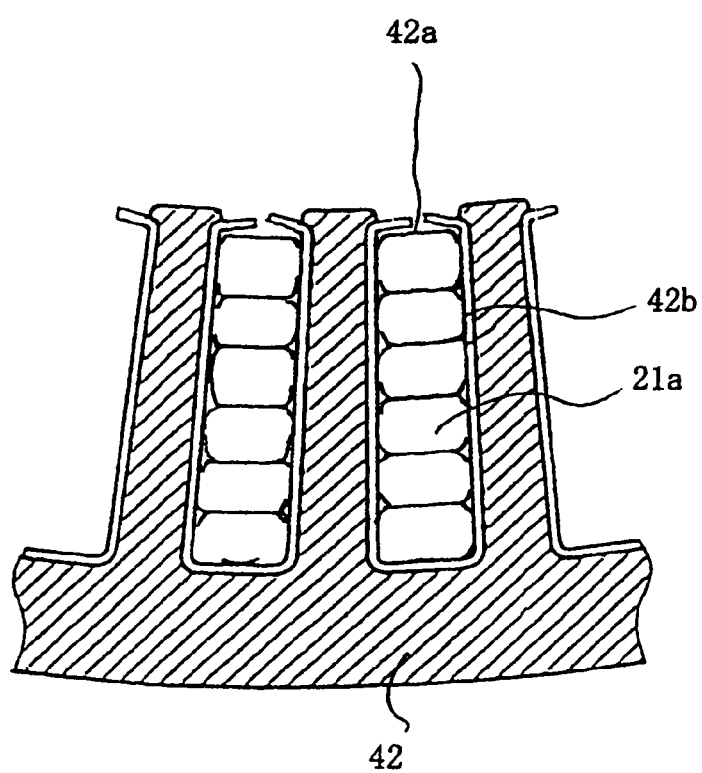
Figure 12:
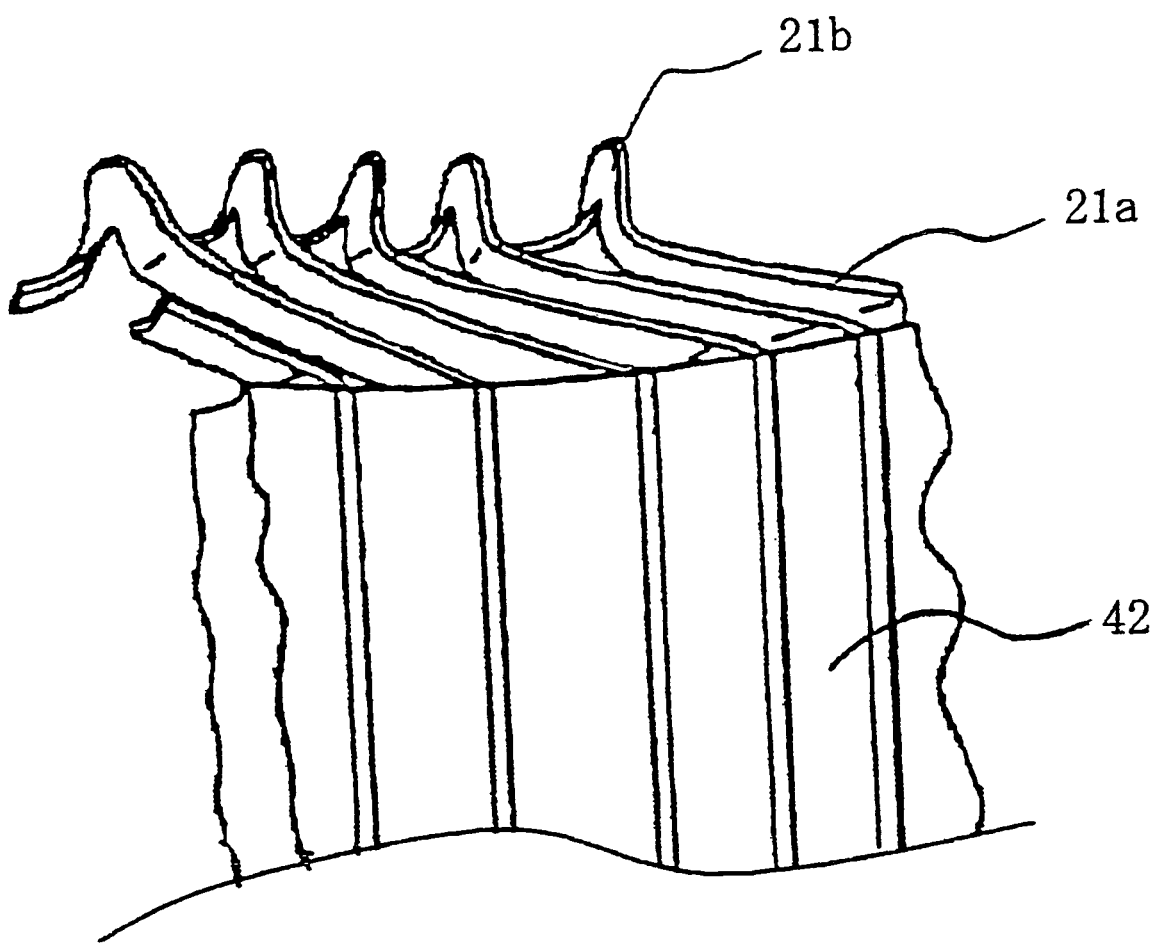
[FIG. 12] It is a main part structural view of a stator coil turn part in embodiment 3.

DESCRIPTION OF REFERENCE NUMERALS AND SIGNS 20 rotating electrical machine, 21 stator winding, 21a or coil, 21b coil turn part, 22 inverter unit, 40 rotor, 40a, 40b magnetic pole, 40c, 40d permanent magnet, 42 stator.

The invention claimed is:

1. A vehicular rotating electrical machine apparatus comprising:
a rotating electrical machine which includes a rotor having a field winding, and a stator disposed at an outer periphery of the rotor and having a stator winding, and performs electric power generation and starting; and an inverter unit which converts DC power of a battery into AC power at a time of a starting motor operation of the rotating electrical machine and supplies it to the stator winding, and converts AC power generated in the stator winding into DC power at a time of a generator operation of the rotating electrical machine and charges the battery, wherein the inverter unit is integrally mounted to the rotating electrical machine and is electrically connected to the stator winding, the rotor includes a rotor iron core which includes a magnetic part where adjacent magnetic poles are formed to have different polarities, and a field winding, and a permanent magnet which is disposed between the adjacent magnetic poles and supplies, together with the field winding, magnetic flux to the stator iron core, and the magnetic flux by the permanent magnet is adjusted so that in an actual use rotation speed range of the rotating electrical machine, a deenergization no-load induced voltage or a deenergization induced voltage in a minimum electric load power generation state does not exceed a voltage of the battery.

2. A vehicular rotating electrical machine apparatus according to claim 1, characterized in that the rotor is a claw-pole type rotor, and the permanent magnet includes a pair of permanent magnets interposed between pawl-shaped magnetic pole parts of the rotor.

3. A vehicular rotating electrical machine apparatus according to claim 1, characterized in that the inverter unit is integrally mounted on an end face of the rotating electrical machine in an axial direction.

4. A vehicular rotating electrical machine apparatus according to claim 1, characterized in that the inverter unit is integrally mounted on a surface of the rotating electrical machine in a radial direction.

5. A vehicular rotating electrical machine apparatus according to claim 1, characterized in that the rotating electrical machine includes a cooling fan, and cooling is made by cooling air thereof in order of the inverter unit, the rotor, and the stator.

6. A vehicular rotating electrical machine apparatus according to claim 1, characterized in that the stator winding includes a rectangular wire or a stator coil arrayed or shaped into a rectangular shape.

7. A vehicular rotating electrical machine apparatus according to claim 6, characterized in that a sectional shape of a coil turn part of the stator winding is round.

8. The vehicular rotating electrical machine apparatus of claim 1, wherein the inverter unit further comprises a heat sink.

* * * * *